3,125,560
PURIFICATION OF POLYMERS
John Brewster Rose, St. Albans, England, assignor to Imperial Chemical Industries Limited, Millbank, London, England, a corporation of Great Britain
No Drawing. Filed Oct. 5, 1959, Ser. No. 844,158
Claims priority, application Great Britain Oct. 13, 1958
21 Claims. (Cl. 260—93.7)

This invention relates to the treatment of polymers.

Processes have been described for the polymerisation of unsaturated hydrocarbons to high molecular weight solid polymers in the presence of a catalyst containing metal compounds. Such catalysts may be formed by treating a transition metal compound such as, for example, titanium tetrachloride, titanium trichloride or vanadium tetrachloride with an organo-metallic compound such as an aluminium alkyl, an alkyl aluminium halide, a complex alkyl of an alkali metal and aluminium, for example, lithium aluminium tetramethyl or an alkali metal alkyl. These polymerisation processes may be carried out in the presence of an inert liquid such as a liquid hydrocarbon, or in the presence of an excess amount of the unsaturated hydrocarbon in the liquid phase.

Examples of particularly valuable solid polymers produced by these processes are polyethene and polypropylene, especially isotactic polypropylene.

The crude product of these processes is a solid polymer with occluded metal-compound containing catalyst residues. The crude product is usually in the form of a suspension in a hydrocarbon liquid. When the polymer is isotactic polypropylene the hydrocarbon liquid may contain atactic polypropylene in solution.

It is very desirable to remove the catalyst residues from the polymer, otherwise the polymer may be discoloured, may undergo decomposition, particularly under the action of heat, and may cause the corrosion of, e.g. moulding equipment.

Catalyst residues may be removed from a polymer by treatment with a chelating agent such as acetyl acetone, ethyl acetoacetate, etc., but such processes have the disadvantage that a relatively large amount of chelating agent, which is expensive, is required.

We have now found that catalyst residues may be removed from a suspension of a polymer, after polymerisation, by treatment with certain reagents, e.g. chelating agents, and extraction of the metal-compounds formed from the suspension by an aqueous solution of a substance hereinafter referred to. This process has the advantage that only small amounts of the first mentioned reagent are required.

Accordingly, this invention provides a process for the removal of catalyst residues from a polymer, said residues containing at least one compound of a transition metal of groups IV to VI of the periodic system in which there is added to the polymer, in the presence of a hydrocarbon liquid, a reagent A and the mixture is then subjected to an extraction treatment with an aqueous solution of a reagent B; the reagent A being chosen from reagents soluble, preferably to an extent of at least 1% by weight, in hydrocarbons and at least sparingly soluble in water, which in hydrocarbon solution will form with said transition metal compound a hydrocarbon solution of a transition metal coordination compound decomposable by the said aqueous solution during extraction; and reagent B being chosen from reagents soluble, preferably to an extent of at least 1% by weight, in water, which in aqueous solution will decompose the hydrocarbon soluble transition metal coordination compound during the extraction to form a water soluble compound, stable to hydrolysis under the extraction conditions, which is effectively insoluble in hydrocarbon liquids.

Preferably the said water soluble compound should be stable to hydrolysis on subsequent steam distillation. The reagent A should preferably, in order to get rapid extraction, show a solubility in water at the extraction temperature of at least 0.1 g. per 100 cc. Such a reagent A will form coordination compounds which are at least sparingly soluble in water and are readily transferred through the hydrocarbon-water interface.

Compounds which have been found effective as the said reagent A include diketones having up to 8 carbon atoms in the molecule and having the formula

R'—CO—CHR'''—CO—R''

β-keto esters having up to 8 carbon atoms in the molecule and having the formula R'—CO—CHR'''—CO—OR'' where R' and R'' may be alkyl groups and R''' may be a hydrogen or alkyl group; and primary or secondary acyclic alkyl mono- or poly-amines having between 4 and 9 carbon atoms per amino group in the molecule.

It is believed that the reagent A reacts with the metal compounds in the catalyst residues to form coordination compounds which are transferred through the liquid hydrocarbon solution to the aqueous extraction medium where the coordination compound is decomposed and the reagent A reformed.

Of the above reagents A we prefer to use acetyl acetone or propionyl acetone because of their effectiveness, and particularly prefer acetyl acetone because of its availability and cheapness. Other diketones may, however, be used, e.g. butyryl acetone, valeryl acetone, hept-3:5-dione and 3-methyl pent-2:4-dione. Of the β-keto esters we prefer to use methyl acetoacetate or ethyl acetoacetate because of their availability. Of the amines, primary amines between 6 and 9 carbon atoms per amine group are preferred, because of their effectiveness, and n-nonylamine is particularly preferred because of its availability and effectiveness.

In general the quantity of the reagent A chosen should be at least sufficient to promote effective and rapid transfer of the metal compounds to the aqueous solution and at least sufficient to be half the stoichiometric amount required to form hydrocarbon soluble coordination compounds with the metal compounds present in the catalyst residues and, for example, between 0.01 mole and 0.1 mole of the reagent A per 100 grams of dry polymer where the unextracted polymer contains about .05% titanium and .1% aluminium (calculated by weight as metals). When acetyl acetone is used we prefer to use between 1% and 10% of acetyl acetone by weight of the dry weight of polymer and more preferably between 1½ and 5% by weight As the reagent B oxalic acid; hydroxy carboxylic acids such as tartaric acid and citric acid; hydrochloric acid; boric acid; aliphatic polyamines such as ethylene diamine; polyphosphates having the formula $(MPO_3)_m$ or $$M_{n+2}P_nO_{3n+1}$$

and alkali metal phosphate glasses or mixtures of such polyphosphates and alkali metal phosphate glasses, where M is chosen from ammonium, lithium, sodium and potassium, $m$ is an integer not less than 3 and $n$ is an integer not less than 2; and complexing agents (sequestering agents) such as ethylene diamine tetra acetic acid and its alkali metal and ammonium salts have been found effective. In general complexing or sequestering agents forming complexes which are stable in water under the conditions used may be employed. Mixtures of different reagents may be used.

Examples of polyphosphates which may be used are sodium pyrophosphate ($Na_4P_2O_7$), sodium tripolyphosphate ($Na_5P_3O_{10}$), sodium tetrapolyphosphate ($Na_6P_4O_{13}$), sodium trimetaphosphate ($NaPO_3)_3$, sodium tetrametaphosphate ($NaPO_3)_4$, "Calgon" which is a sodium phosphate glass often loosely referred to as "sodium hexametaphosphate," and the sodium phosphate glasses generally. The sodium phosphate glasses are complex mixtures of polyphosphates having an $Na_2O:P_2O_5$ mole ratio between 1.1 and 2:1, the analysis and constitution of typical sodium phosphate glasses is described in Van Wazer, "Phosphorus and Its Compounds," Interscience, New York 1958, chapter 12, particularly pages 756 to 769 and 775 to 781.

Of these polyphosphates it is preferred to use sodium tripolyphosphate, sodium pyrophosphate or "Calgon" (registered trademark) because of their effectiveness and ready availability. We particularly prefer to use sodium tripolyphosphate when extracting catalyst residues containing titanium compounds since it is the most effective giving the whitest polymer and the polymer having the lowest titanium content. Mixtures of the said phosphates with other complexing or sequestering agents, e.g. citric acid, may be used in the process of this invention. Of the other complexing agents citric acid and oxalic acid are preferred, because they are cheap and effective, but citric acid is preferred if the extraction procedure is to be carried out in iron or steel containers since oxalic acid solutions tend to corrode such containers.

The process of this invention is particularly applicable to the removal of metal containing catalyst residues from polymers of unsaturated hydrocarbons such as polythene and polypropylene prepared for instance those in the presence of a catalyst formed by mixing a titanium compound such as titanium tetrachloride or titanium trichloride or a vanadium compound such as vanadium tetracloride with an organometallic compound of aluminium for example, an aluminium alkyl, or a catalyst produced by the process of copending U.S. patent application No. 703,732, filed December 19, 1957, now abandoned. However, this invention is not limited to the removal of such catalyst residues and may for instance, be used to remove catalyst residues containing compounds of other transition metals, i.e. Zr, Hf, Th, V, Nb, Ta, Cr, Mo or W compounds. Compounds of metals of groups II and III of the periodic system besides those of aluminium may also be removed during the operation of this process i.e. compounds of Be, Mg, Zn, Cd, Hg, Ga, In and Tl.

For simplicity of operation we prefer to carry out our process in the presence of the liquid hydrocarbon used in the polymerisation reaction wherein the polymer is formed. For ease of working the amount of liquid hydrocarbon may be an amount sufficient to give a relatively fluid suspension of the polymer. Conveniently, where the polymer has been produced by polymerising a monomer in a liquid hydrocarbon medium, the suspension of polymer as obtained may be used directly, for instance, polypropylene suspended in a petroleum ether fraction or polypropylene suspended in unpolymerised propylene. A fluid suspension of the polymer in liquid hydrocarbon is, however, not necessary to our process, and the amount of hydrocarbon occluded with the polymer after filtering or centrifuging is sufficient for our process. This amounts to about 40% to 70% by weight of the polymer. When the hydrocarbon liquid has been partially removed in this manner, the reagent A should be thoroughly admixed with the polymer before water or aqueous reagent B are added. In general, I prefer to use an aliphatic hydrocarbon which is liquid under the conditions under which the process of this invention is carried out.

The metal containing residues in the polymer before treatment by my process are reactive compounds which tend to form compounds which are not easily extracted if they are brought into contact with oxygen. For optimum results therefore the process of this invention should be applied before the polymer has contacted oxygen and the process should be effected in the absence of oxygen. It is preferable to carry out the process of this invention in the absence of air and, if desired, in the presence of an inert gas such as nitrogen or argon.

The process of this invention is best conducted when the extraction mixture includes a wetting agent. A very suitable wetting agent is an octyl phenol/ethylene oxide condensation product.

It is preferred to subject the polymer subsequently to treatment with steam to remove the liquid hydrocarbon, such treatment being particularly effective when carried out by digestion with steam in the presence of a small quantity of a wetting agent. The polymer may finally be filtered or centrifuged and dried in vacuum.

The following examples illustrate my invention. It will be understood, however, that our invention is in no way limited by these examples.

EXAMPLE 1

*Acetyl Acetone-Water Soluble Complexing Agent Systems*

Acetyl acetone (1 ml.) was added to a slurry (400 cc. approx., containing up to 20% polymer prepared in the presence of a catalyst containing aluminium tri-ethyl and a reduced titanium halide) of polypropylene in petroleum ether (B.P. 60–80° C.) and the slurry refluxed for ½ hr. A wetting agent (6 ml. of a 30% aqueous solution of an octyl phenol/ethylene oxide condensation product), a water soluble agent (see Table 1 below) and deoxygenated water (500 ml.) were added and the slurry refluxed for a further half hour, steam distilled to remove petroleum ether and filtered. Further wetting agent (2 ml.) was added to the polymer and further deoxygenated water (500 ml.) and the slurry heated for ½ hr. The slurry was then filtered and the polymer dried under vacuum. The foregoing process was carried out under nitrogen. The dry weight of the polymer obtained and the ash and titanium contents were measured. The results are given in Table 1.

TABLE 1

| Exp. | Water Soluble Complexing Agent | Dry Weight of polypropylene, g. | Ash Content, Percent | Titanium Content, p.p.m. |
|---|---|---|---|---|
| 1 | Oxalic acid (2 g.) | 36 | 0.02 | 16 |
| 2 | Hydrochloric acid (concentrated) (2 ml.) | 34 | 0.04 | 55 |
| 3 | Tartaric acid (2 g.) | 47 | 0.02 | 20 |
| 4 | Boric acid (2 g.) | 48 | 0.07 | 31 |
| 5 | Ethylene diamine (2 ml.) | 47 | 0.03 | 73 |
| 6 | Citric acid (2 g.) | 47 | 0.03 | 22 |

P.p.m.=parts per million.

The untreated polymer contained 0.45% ash and 500 p.p.m. titanium and 1000 p.p.m. aluminium approx.

EXAMPLE 2

*Acetyl Acetone-Oxalic Acid System—Effect of Acetyl Acetone Concentration*

The general procedure of Example 1 was followed except that 8 ml. of the wetting agent were used in the first treatment with deoxygenated water and water soluble complexing agent. 2 g. of oxalic acid and varying amounts of acetyl acetone were used as set out in Table 2.

TABLE 2

| Exp. | Amount of acetyl acetone used, ml. | Dry Weight of Polypropylene, g. | Ash Content, Percent | Titanium Content, p.p.m. |
|---|---|---|---|---|
| 7 | 5 | 30 | 0.03 | 10 |
| 8 | 5 | 39 | <0.01 | <10 |
| 9 | 2 | 44 | 0.04 | 29 |
| 10 | 2 | 37 | 0.02 | 10 |
| 11 | 2 | 54 | <0.01 | <10 |
| 12 | 1 | 38 | 0.02 | <10 |
| 13 | 1 | 38 | 0.04 | 10 |
| 14 | 1 | 36 | 0.02 | 16 |
| 15 | 0.75 | 48 | <0.01 | 20 |
| 16 | 0.5 | 37 | 0.05 | 39 |
| 17 | 0.5 | 35 | 0.05 | 60 |
| 18* | 0.5 | 39 | 0.03 | 31 |
| 19* | 0.5 | 39 | 0.03 | 30 |

*Refluxed after the addition of acetylacetone for 2 hours instead of ½ hr
P.p.m.=parts per million.

The untreated polymer contained approx. 0.45% ash and approx. 500 p.p.m. titanium and 1000 p.p.m. aluminium.

EXAMPLE 3

*Effect of Varying Conditions and Order of Adding the Reagents*

The general procedure of Example 1 was followed with the variations stated in Table 3 but the following quantities of wetting agent, deoxygenated water, acetyl acetone and oxalic acid were used.

First addition of wetting agent—wetting agent (8 ml.) in deoxygenated water (500 ml.)
Second addition of wetting agent—wetting agent (2 ml.) in deoxygenated water (500 ml.)
Acetyl acetone (5 ml.)
Oxalic acid (2 g.)

TABLE 3

| Exp. | Conditions | Dry Weight of Polypropylene, g. | Ash Content Percent | Titanium Content, p.p.m. |
|---|---|---|---|---|
| 20 | As in Example 1 | 30 | 0.03 | 10 |
| 21 | ----do---- | 39 | 0.01 | 10 |
| 22 | First reflux step omitted | 39 | 0.01 | 10 |
| 23 | ----do---- | 32 | 0.03 | 24 |
| 24 | WA and DOW added first then AA and OA. The first reflux step was omitted. | 37 | 0.04 | 40 |
| 25 |  | 61 | 0.04 | 40 |
| 26 | Bulk of PE filtered off then AA, OA, WA, and DOW added. The first reflux step was omitted. | 54 | 0.02 | 16 |
| 27 | WA and DOW added, PE steam distilled off, the polymer filtered, then AA, OA, WA and DOW added to the polymer. The first reflux step was omitted. | 43 | 0.07 | 280 |
| 28 |  | 37 | 0.07 | 300 |
| 29 | WA and DOW added, PE steam distilled off, the polymer filtered then AA, OA, WA and DOW added to the polymer with toluene (25 ml.). The first reflux step was omitted. | 48 | 0.07 | 250 |
| 30 |  | 54 | 0.08 | 282 |

P.p.m.=parts per million.
PE=petroleum ether.
WA=wetting agent (cf. Example 1).
DOW=deoxygenated water.
AA=acetyl acetone.
OA=oxalic acid.

The untreated polymer contained approx. 0.45% ash and 500 p.p.m. titanium and 1000 p.p.m. aluminium.

EXAMPLE 4

Acetyl acetone (2.0 ml.) was added under nitrogen to a stirred suspension of polypropylene in petroleum ether (B.P. 60–80° C.), prepared in this solvent by polymerisation using a trichloride of titanium [1]/Al(C$_2$H$_5$)$_2$Cl catalyst. The mixture was stirred under reflux for three hours, and then 30 ml. of a 5% solution in deoxygenated water of a wetting agent (an octyl phenol/ethylene oxide condensation product "Lissapol N") was added, followed by the solid phosphate and deoxygenated water (600 ml.).

The mixture was stirred under reflux for 30 minutes and was then steam-distilled to remove the petrol. The resulting aqueous slurry was filtered and the polymer was washed with deoxygenated water (1 litre) and wetting agent (10 ml.) at 60–70° C. for 30 minutes. The suspension was then filtered and the polymer was dried in a vacuum oven at 60° C.

The dry weights of the polymers obtained, and the ash and titanium contents were measured—results appear in Table 4.

TABLE 4

| Phosphate | Expt. No. | Wt. Phosphate (g.) | Wt. Polymer (g.) | Ash (percent) | Titanium (p.p.m.) | Grade* A | Grade* B |
|---|---|---|---|---|---|---|---|
| Na$_5$P$_3$O$_{10}$ | 1 | 7 | 123 | 0.02 | 46 | 2 | 2 |
|  | 2 | 3 | 127 | 0.07 | 20 | 2 | 2 |
|  | 3 | 7 | 78 | 0.06 | 34 | 2 | 2 |
| Na$_4$P$_2$O$_7$ | 4 | 3 | 159 | 0.09 | 70 | 2 | 2 |
|  | 5 | 4 | 127 | 0.03 | 32 | 2 | 2 |
| "Calgon S" | 6 | 7 | 110 | 0.04 | 61 | 2 | 2 |
|  | 7 | 3 | 141 | 0.07 | 64 | 2 | 2 |

P.p.m.=parts per million.
* The grade number referred to relates to an arbitrary scale taking into account whiteness and clarity of mouldings of polymer moulded at A 190° C. for 8 minutes and B at 250° C. for 8 minutes. These grade numbers may be approximately described as:
1. Very clear and water white.
2. Translucent and white.
3. Translucent and off white.
4. Semi-opaque and white discoloured with a tendency towards pale brown.
5. Opaque and pale brown.

Untreated polymer contained ca. 0.3% ash, and about 400 p.p.m. Ti and about 800 p.p.m. aluminium.

EXAMPLE 5

The procedure of Example 4 was repeated using mixtures of phosphate and citric acid instead of phosphate alone. The results are indicated in Table 5.

TABLE 5

| Volume of acetyl acetone, ml. | Phosphate | Wt. of phosphate (g.) | Wt. of citric acid (g.) | Ash (percent) | Ti (p.p.m.) | Grade A | Grade B |
|---|---|---|---|---|---|---|---|
| 2.0 | Na$_5$P$_3$O$_{10}$ | 3.0 | 1.0 | 0.08 | 22 | 2 | 2 |
| 2.0 | Na$_4$P$_2$O$_7$ | 4.0 | 1.0 | 0.03 | 32 | 2 | 2 |
| 2.0 | Na$_4$P$_2$O$_7$ | 4.0 | 1.0 | 0.06 | 16 | 2 | 2 |

EXAMPLE 6

Acetyl acetone (2 ml.) was added under nitrogen to a stirred suspension of polypropylene in petroleum ether (B.P. 60–80° C.) obtained by polymerisation of propylene using a trichloride of titanium/Al(C$_2$H$_5$)$_2$Cl catalyst (see Example 4). The mixture was stirred under reflux for 3 hours, and then 40 ml. of a 2% solution in deoxygenated water of "Lissapol N," tetrasodium ethylene-diamine-tetraacetate (7.0 g.) and a further 700 ml. deoxygenated water were added to the blue suspension. The mixture was then stirred at 60–70° under nitrogen for 30 minutes.

The petroleum ether was removed by steam distillation (1½ hours) and the aqueous phase separated off by filtration. Deoxygenated water (1 litre) was added to the polymer and the slurry was maintained at 60° C. for 30 minutes, and then filtered. The polymer, after being dried in vacuo at 60° C. was then in the form of a white powder (105 g.) and contained 0.05% ash and 53 p.p.m. titanium.

The untreated polymer contained approx. 23% ash, 250 p.p.m. titanium and 500 p.p.m. aluminium.

---
[1] Prepared by reacting TiCl$_4$ with aluminium according to the process of copending United States patent application Serial No. 703,732, filed December 19, 1957, now abandoned.

EXAMPLE 7

Carried out as in Example 1 using 3 ml. β-diketones as shown in Table 6, 600 cc. of slurry containing approximately 100 g. polymer, and 5 g. citric acid in 1 litre of deoxygenated water. The ash contents and titanium contents of the polymers obtained are shown below in Table 6. The untreated polymer contained approx. .24% ash, 380 p.p.m. titanium and 800 p.p.m. aluminium.

TABLE 6.—β-DIKETONES OF FORMULA R'—CO—CH$_2$—CO—R

| R | R' | Ash (percent) | Ti (p.p.m.) | Grade A | Grade B |
|---|---|---|---|---|---|
| CH$_3$ | CH$_3$ | 0.04 | 17 | 2 | 2 |
| CH$_3$ | C$_2$H$_5$ | 0.04 | 33 | 2 | 2 |
| CH$_3$ | n-C$_3$H$_7$ | 0.05 | 45 | 2 | 3 |
| C$_2$H$_5$ | C$_2$H$_5$ | 0.06 | 25 | 3 | 3 |
| CH$_3$ | i-C$_4$H$_9$ | 0.07 | 71 | 3 | 4 |

EXAMPLE 8

Nonylamine (mono-n-nonylamine) (5 ml.) was added to a slurry in petroleum ether (600 cc. approx.) containing 81 g. dry weight of polypropylene prepared using a catalyst containing aluminium triethyl and a reduced titanium halide and the slurry was refluxed for 2 hours. 5 g. citric acid in 700 ml. deoxygenated water containing 35 ml. of a 5% aqueous solution of an octyl phenol ethylene oxide condensation product was added and the mixture refluxed for ½ hour. A further 2 g. citric acid in 600 ml. deoxygenated water containing 20 ml. of 5% aqueous solution of the said condensation product were added and the mixture steam distilled. The polypropylene was filtered off, suspended in 1 litre of deoxygenated water and heated to 60° C. for ½ hour and finally filtered and dried. 81 g. polypropylene were obtained having an ash content of 0.06% and a titanium content of 17 p.p.m. The grade numbers of mouldings were A–2 and B–2 (these grade numbers are explained in Example 4). The untreated polymer contained approx. .13% ash, 260 p.p.m. titanium and 500 p.p.m. aluminium.

EXAMPLE 9

Carried out as in Example 8 on the same polymer suspension but using 5 g. oxalic acid instead of citric acid. The yield of polymer was 132 g., ash content 0.06%, titanium content 19 p.p.m. and the moulding grade numbers of mouldings A–2 and B–2.

EXAMPLE 10

Carried out as in Example 8 on the same polymer suspension using 2 ml. of hexylamine instead of nonylamine. The yield of polypropylene was 124 g., ash content 0.06%, titanium content 48 p.p.m. and the moulding grade numbers of mouldings A–2 and B–2.

EXAMPLE 11

Carried out as in Example 8 on the same polymer suspension using 5 ml. diethylamine. The yield of polypropylene was 114 g., ash content 0.06%, titanium content 30 p.p.m. and the grade numbers of mouldings A–3 and B–3.

EXAMPLE 12

Carried out as in Example 8 on the same polymer suspension using 2 ml. n-octylamine. The yield of polypropylene was 110 g., ash content 0.09%, titanium content 49 p.p.m. and the grade numbers of mouldings A–2 and B–3.

EXAMPLE 13

Ethyl acetoacetate (13 ml.) was added under nitrogen to a 20% w/w suspension of polypropylene in a saturated aliphatic hydrocarbon diluent ("Sinaral"), prepared in this solvent by polymerising propylene using an aluminium alkyl/trivalent titanium halide catalyst, and the suspension heated at 75° C. for 1 hour.

Citric acid (10 g.) in 700 ml. deoxygenated water containing a stearate/ethylene oxide condensate wetting agent was added to the slurry and the mixture was heated at 60° C. for ½ hr. with vigorous stirring. The slurry was filtered and washed with hot water and the polypropylene was then restirred in water and the hydrocarbon liquid ("Sinaral") distilled off. The polypropylene was washed, filtered off and dried.

The yield of polypropylene was 140 g., ash content 0.102% and titanium content 88 p.p.m. The grade numbers of mouldings were A–2 and B–2.

The untreated polymer contained approx. 0.8% ash, 1400 p.p.m. titanium and 1500 p.p.m. aluminium.

I claim:

1. A process for the removal of catalyst residues from a polymer,
said catalyst containing a transition metal compound obtained by mixing an organometallic compound of aluminum with a member of the group consisting of titanium trihalide, titanium tetrahalide, vanadium tetrachloride and the product obtained by reaction of a titanium tetrahalide with aluminum,
said process comprising adding to the polymer, in the presence of a hydrocarbon liquid, a reagent A and subjecting the resultant mixture to an extraction treatment with an aqueous solution of a reagent B; the reagent A being soluble in hydrocarbons and at least sparingly soluble in water, and, in hydrocarbon solution, forming with said transition metal compound a hydrocarbon solution of a transition metal coordination compound which is decomposable by said aqueous solution during extraction, said reagent A being a member of the group consisting of diketones having up to 8 carbon atoms in the molecule and having the formula R'—CO—CHR'''—CO—R'', β-keto esters having up to 8 carbon atoms in the molecule and having the formula

R'—CO—CHR'''—CO—OR'' where R' and R'' are alkyl groups and R''' is a member of the group consisting of hydrogen and alkyl groups and primary and secondary acyclic alkyl mono- and poly-amines having between 4 and 9 carbon atoms per amino group in the molecule;
and reagent B being soluble in water, and, in aqueous solution, decomposing said hydrocarbon soluble transition metal coordination compound during the extraction treatment to form a water soluble compound, stable to hydrolysis under the extraction conditions, which is effectively insoluble in hydrocarbon liquids, said reagent B being selected from the group consisting of complexing and sequestering agents which form complexes which are stable under the conditions used, oxalic acid, hydroxy carboxylic acids, mineral acids, boric acid, aliphatic polyamines, polyphosphates having the formula (MPO$_3$)$_m$, polyphosphates having the formula M$_{n+2}$P$_n$O$_{3n+1}$ and the alkali metal phosphate glasses, where M is an alkali metal selected from the group consisting of lithium, sodium and potassium, $m$ is an integer not less than 3 and $n$ is an integer not less than 2.

2. A process according to claim 1 in which the said water soluble compound is stable to hydrolysis on steam distillation.

3. A process according to claim 1 in which the reagent A is soluble in hydrocarbons to an extent of at least 1% by weight.

4. A process according to claim 1 in which the reagent B is soluble in water to an extent of at least 1% by weight.

5. A process according to claim 1 in which the reagent A is soluble in water to an extent of at least 0.1 g. per 100 ml.

6. A process according to claim 1 in which the reagent A is acetyl acetone.

7. A process according to claim 6 in which between 1% and 10%, by weight of the dry weight of polymer, of acetyl acetone are used.

8. A process according to claim 7 in which between 1½ and 5%, by weight of the dry weight of polymer, of acetyl acetone are used.

9. A process according to claim 1 in which the reagent A is methyl acetoacetate.

10. A process according to claim 1 in which the reagent A is non-nonylamine.

11. A process according to claim 1 in which the amount of reagent A used is at least half the stoichiometric quantity required to react with the metal compounds present in the catalyst residues.

12. A process as set forth in claim 1 in which the reagent A is ethyl acetoacetate.

13. A process as set forth in claim 1 in which the reagent A is propionyl acetone.

14. A process according to claim 1 in which the reagent B is citric acid.

15. A process according to claim 1 in which the reagent B is sodium tripolyphosphate.

16. A process as set forth in claim 1 in which the reagent B is sodium pyrophosphate.

17. A process according to claim 1 in which the polymer is polypropylene.

18. A process according to claim 1 whenever carried out in the substantial absence of oxygen.

19. A process according to claim 1 whenever the aqueous solution of the reagent B contains a wetting agent.

20. A process according to claim 1 in which the polymer is washed, after treatment with said reagent B, with an aqueous solution containing a wetting agent.

21. A process according to claim 1 in which after treatment with the reagents A and B the polymer mixture is steam distilled.

References Cited in the file of this patent

UNITED STATES PATENTS

| | | |
|---|---|---|
| 2,912,420 | Thomas | Nov. 10, 1959 |
| 2,953,554 | Miller | Sept. 20, 1960 |

FOREIGN PATENTS

| | | |
|---|---|---|
| 554,363 | Belgium | July 23, 1957 |
| 1,155,667 | France | Dec. 2, 1957 |